Sept. 8, 1959

F. G. BACK 2,902,901

REFLEX CAMERA VARIFOCAL LENS

Filed June 27, 1958

INVENTOR.
FRANK G. BACK
ATTORNEY

Sept. 8, 1959 F. G. BACK 2,902,901
REFLEX CAMERA VARIFOCAL LENS
Filed June 27, 1958 2 Sheets-Sheet 2

INVENTOR.
FRANK G. BACK
BY *Albert F. Kronman*
ATTORNEY

United States Patent Office 2,902,901
Patented Sept. 8, 1959

2,902,901

REFLEX CAMERA VARIFOCAL LENS

Frank G. Back, Lattingtown, N.Y.

Application June 27, 1958, Serial No. 744,944

2 Claims. (Cl. 88—57)

This invention relates to varifocal lenses and particularly to lenses adaptable for use on still cameras of the single lens reflex type.

Varifocal or "zoom" lenses have been used in the motion picture and television fields for many years. Such lenses, however, are extremely large and are generally unsuited for use in conjunction with still cameras. Where small, hand held, cameras such as those using 35 mm. film, are employed, the attachment of a lens of the size previously necessary for varifocal lenses would be highly impractical.

Accordingly, it is an object of the present invention to provide a varifocal lens structure suitable for use in conjunction with small still cameras.

Another object of the present invention is to provide a varifocal lens which may be adjusted easily and quickly without removing the user's hands from the camera.

A further object of the present invention is to provide a varifocal lens which will maintain the alignment of the lenses throughout the "zoom" adjustment.

Still another object of the present invention is to provide a varifocal lens of rugged construction which will insure the proper spacing of the lens elements over periods of prolonged use.

A still further object of the present invention is to provide a varifocal lens structure into which foreign matter cannot find its way to the detriment of said lens operation.

A feature of the present invention is its use of a sliding ring member to activate the movable lens elements for zooming.

Another feature of the present invention is its use of a compact barrel assembly to hold the lenses in their properly spaced relationship.

Still another feature of the present invention is its use of guide rods to maintain optical alignment of the movable elements.

A further feature of the present invention is the disposition of the iris stop within easy reach of the camera user and adjacent the rear movable element of the varifocal lens.

The invention consists of the construction, combination and arrangement of parts, as herein illustrated, described and claimed.

In the accompanying drawing forming a part hereof is illustrated one form of embodiment of the invention and in which.

Figure 1:
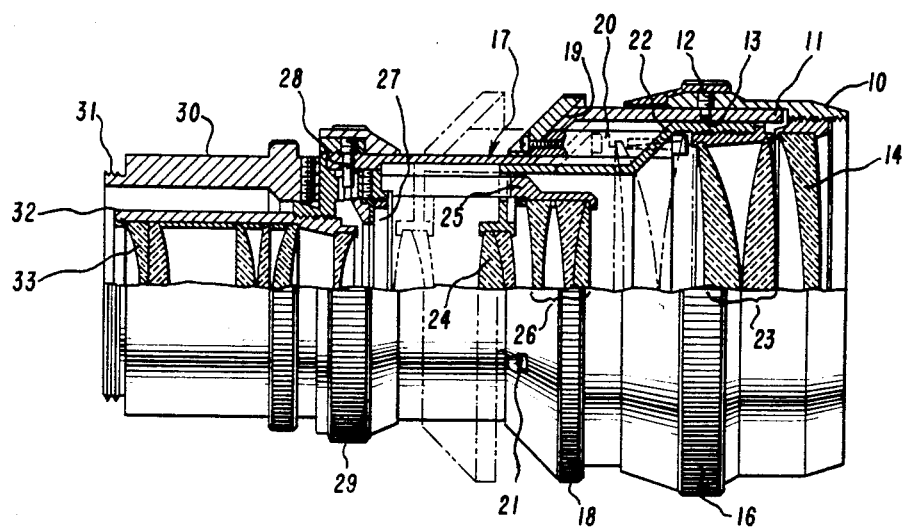
Figure 1 is a view in side elevation of a complete embodiment of the present invention partially broken away to show the internal arrangement and the various lens positions.

Referring to the drawing, 10 indicates a front lens barrel which is rotatably carried upon the lens housing 11. The front lens barrel 10 is provided with a pin 12 which rides within a helical slot 13 in the housing 11. As the barrel 10 is rotated, the front lens 14 is moved towards or away from the camera 15 for focusing purposes. A knurled ring 16 is secured to the front lens barrel to facilitate the rotation of the said barrel.

The lens housing 11 is a two diameter cylindrical structure as indicated at 17. The front lens barrel 10 is carried upon the larger of the two diameters and a control ring 18 hereinafter referred to as the "zoom" control ring, is received upon the small diameter of the housing 11.

The zoom control ring 18 is disposed at an angle with respect to the longitudinal axis of the lens and conforms to a tapered portion 19 between the large and small sections of the housing 11. When the ring 18 is in its maximum forward position it bears against the tapered portion 19. The shape of the ring facilitates grasping it for zooming.

Guide rods 20 shown in Figure 1, are secured to the zoom control ring 18, by screws 21 and extend through the housing 11 into the lens structure proper. The guide rods 20 are attached at their other ends to a lens barrel 22, hereinafter referred to as the intermediate barrel. The intermediate barrel 22 provides the support for a lens assembly known in the varifocal lens art as the variator 23, and also for the lens assembly commonly referred to as the compensator 24. The variator 23 and compensator 24 are coupled in fixed spaced relationship by the intermediate barrel 22 as shown in Figure 1. As the zoom control ring 18 is slid back and forth upon the housing 11, the variator and compensator are carried with it by reason of the guide rods 20.

An inner barrel 25 is carried by the lens housing 11 between the variator and compensator and is rigidly secured to the said housing 11. The inner barrel 25 is stationary and supports the lens elements 26 which are known in the varifocal lens art as the erector. The erector 26 serves to reverse the image coming through the front lens and variator of the varifocal lens system. The position of the movable variator and compensator 23, 24, in the rear position of the zoom is shown in dashed lines in Figure 1. It will be noted that in this position the last movable element of the compensator 24 is close to the iris stop 27 of the lens.

Figure 2:
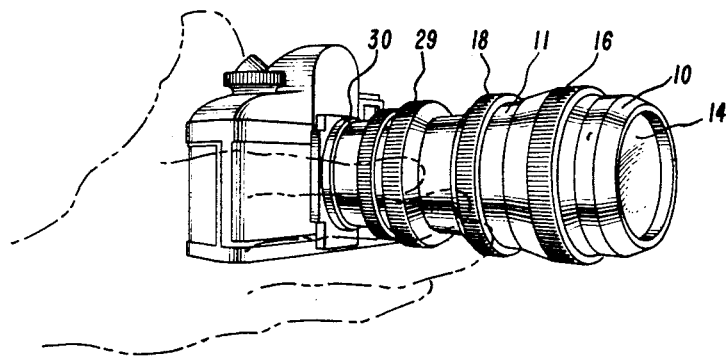
Figure 2 is an isometric view of the varifocal lens shown in Figure 1 as attached to a still camera with the user's hand indicated in dashed lines to show the various size relationships.
Figure 3:
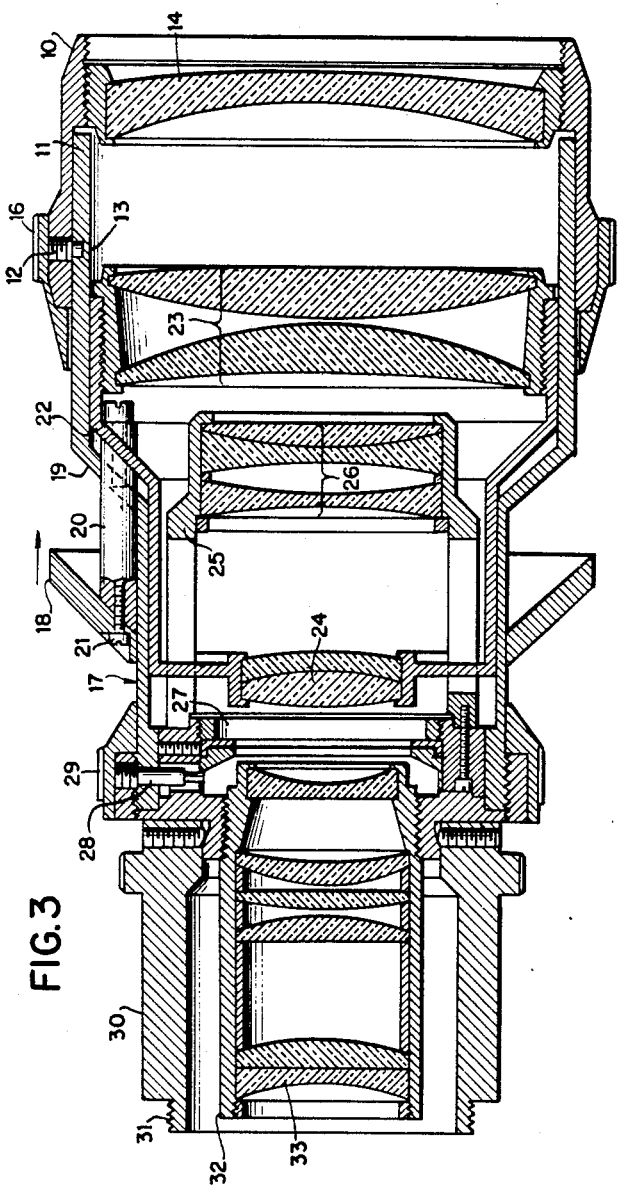
Figure 3 is a view in longitudinal section of a complete embodiment of the present invention similar to the showing of Figure 1, with the control ring in the rear position, somewhat enlarged.
Figure 4:
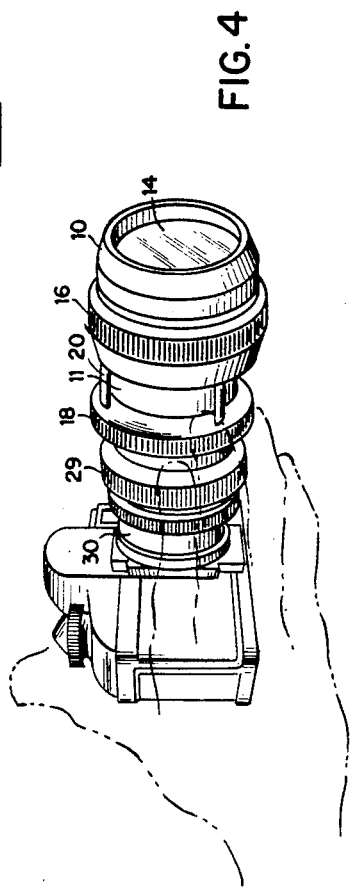
Figure 4 is an isometric view of the varifocal lens shown in Figures 1, 2, and 3, with the control ring in the rear position.

The iris stop is carried at the inner end of the housing 11 and is controlled by means of a suitable pin 28 which traverses the housing 11 and engages the iris stop structure. A knurled ring 29 which is rotatably carried upon the housing 11 engages the pin 28 so that the camera user may regulate the iris stop. It will be noted from an examination of Figure 2 that the hands of the camera user can easily reach the front lens focusing ring 16, the zoom ring 18 and the iris stop control ring 29 without releasing the camera. In single lens reflex cameras, all of these adjustments can be made while the operator is looking through the camera in the customary manner.

While the focusing of the front lens may be accomplished by means of the ring 16 as hereinabove described, it is also possible to couple the front lens barrel 10 directly to the zoom ring 18 and to provide for rotation of the zoom ring whereby focusing can be accomplished at the same time and through the same control as selection of the camera zoom position.

The relay portion of the varifocal lens according to the present invention is secured to the housing 11 behind the iris stop 27. The relay assembly consists of a barrel 30 which is provided with threads 31 or some other suitable fastening means for securing the entire lens assembly to a camera. Within the relay barrel 30 there is carried a lens barrel 32 within which the various elements 33 of the relay are secured in their desired relationship.

When it is desired to use the varifocal lens device hereinabove described the operator merely attaches it to the camera in the place of the conventional lens and focuses the camera upon the scene or object which is desired to be photographed. Thereafter, the lens will remain in focus throughout the zoom and such matters as iris stop settings and the shifting of the longitudinally slidable lens members can be accomplished with great ease.

By reason of the rod members 20 the intermediate barrel can be slide along the longitudinal axis of the lens with great smoothness and without disturbing the alignment of the lenses carried thereby. In addition, the rods prevent foreign matter from entering the lens since the tolerance between the openings in the housing 11 and the outside diameter of the rods 20 may be kept fairly small.

It will be noted that all of the customary lens operations such as focusing and setting the iris stop are accomplished by rotatable controls as is customary in the photographic art. The zoom, however, which is not a familiar still camera adjustment is controlled by a longitudinally slidable ring. In this manner, confusion will not occur during the operation of the lens.

While the foregoing description and the drawings have been directed toward optically compensated zoom lenses, it is within the purview of the present invention to use mechanically compensated zoom lenses in the same assembly.

Having thus fully described the invention, what is claimed as new and desired to be secured by Letters Patent of the United States, is:

1. A mounting for a varifocal lens assembly having in the order of the incident light a front section consisting of a stationary front lens, an axially slidable variator, a stationary erector and an axially slidable compensator, a rear section consisting of a stationary relay and an iris diaphragm stop between the front and rear sections, a two diameter stepped outer lens housing, a rotatable barrel on the front of the outer housing to receive the front lens, rotatable means at the rear of the housing to control the iris diaphragm, an intermediate barrel axially slidable within the outer housing, said intermediate barrel having the variator secured at the front thereof and the compensator mounted at the rear thereof, a stationary inner barrel within the intermediate barrel to support the erector, said inner barrel being secured to the outer housing, a ring member slidably carried around the smaller diameter of the outer housing, peripherally spaced rods disposed parallel to the optical axis of the lens, connected at one end to the ring member and extending through the enlarged portion of the outer housing and means to secure the ends of the rods within the enlarged portion of the housing to the intermediate barrel whereby the variator and compensator may be moved along the optical axis of the lens with respect to the stationary elements by sliding the ring member along the smaller diameter of the outer housing.

2. A varifocal lens assembly according to claim 1 in which the ring member has a face angularly disposed with respect to the longitudinal axis of the lens assembly and the two diameter outer lens housing is provided with a tapered portion between the large and small diameter which conforms to and mates with the angular disposition of the ring face, whereby foreign matter is excluded from the inside of the lens mounting at all times.

References Cited in the file of this patent
UNITED STATES PATENTS

| | | |
|---|---|---|
| 2,454,686 | Back | Nov. 23, 1948 |
| 2,566,485 | Cuvillier | Sept. 4, 1951 |
| 2,784,644 | Bednarz | Mar. 12, 1957 |

OTHER REFERENCES

"The Basic Theory of Varifocal Lenses With Linear Movement and Optical Compensation," Back et al., article in the Journal of the Optical Society of America, vol. 44, No. 9, September 1954, pp. 684–697 cited.